United States Patent [19]

Simard

[11] Patent Number: 4,524,798

[45] Date of Patent: Jun. 25, 1985

[54] SAFETY VALVE FOR AUTOMATICALLY STOPPING THE FLOW OF A FLUID BROUGHT BY A CONDUIT TO A RESERVOIR

[76] Inventor: Patrice Simard, 53 de Vimy Ave., Outremont, Quebec, Canada, H3S 2P9

[21] Appl. No.: 631,405

[22] Filed: Jul. 16, 1984

[30] Foreign Application Priority Data

Sep. 16, 1983 [CA] Canada .................................. 436911

[51] Int. Cl.³ ...................... F16K 31/18; F16K 33/00
[52] U.S. Cl. ...................................... 137/448; 4/538; 4/661
[58] Field of Search .................... 4/538, 661; 137/436, 137/445, 448; 141/212, 213; 251/298

[56] References Cited

U.S. PATENT DOCUMENTS

| | | | |
|---|---|---|---|
| 529,998 | 11/1894 | Beall | 84/481 |
| 1,054,500 | 2/1913 | Bradley et al. | 141/212 |
| 1,233,654 | 7/1917 | Dziatkiewicz | 137/448 |
| 1,246,033 | 11/1917 | Adams | 137/448 |
| 1,765,078 | 6/1930 | Khun | 137/448 |
| 2,124,783 | 7/1938 | Kottemann | 137/445 |
| 2,303,179 | 11/1942 | Sitton et al. | 141/212 |
| 2,504,450 | 4/1950 | Rhodes | 141/213 |
| 2,507,545 | 5/1950 | Samiran | 137/429 |
| 3,078,867 | 2/1963 | McGillis et al. | 137/436 |

Primary Examiner—George L. Walton
Attorney, Agent, or Firm—Robic, Robic & Associates

[57] ABSTRACT

A safety valve for automatically stopping the flow of a fluid brought by a conduit into a reservoir when the level of fluid in the reservoir reaches a maximum predetermined height. This valve is of the type comprising an obturation plate pivotally mounted in a housing provided in the supply conduit proximate the outlet of the conduit, and a control device including a float mounted at the end of a rod arranged to rock the obturation plate from an open position where it allows the fluid to flow freely to a closed position where it obturates the conduit to thereby stop the flow of fluid and consequently its arrival into the reservoir when the level of the fluid has reached the predetermined maximum level aforesaid. The pivot on which the obturation plate is mounted is provided on the outside of the housing and of the supply conduit, and is preferably made up of two aligned stub axles respectively seating into two small bearings made solid with two opposed external surfaces of the housing of the obturation plate. Preferably, the control device acts on the obturation plate to rock it through a lever comprising a stirrup of which the two ends are rigidly secured to the two pivot stub axles. This safety valve, which is a structure of which the maintenance is extremely easy, is particularly useful at the end of a supply spout of a bathtub to avoid that the latter inadvertently overflows.

19 Claims, 13 Drawing Figures

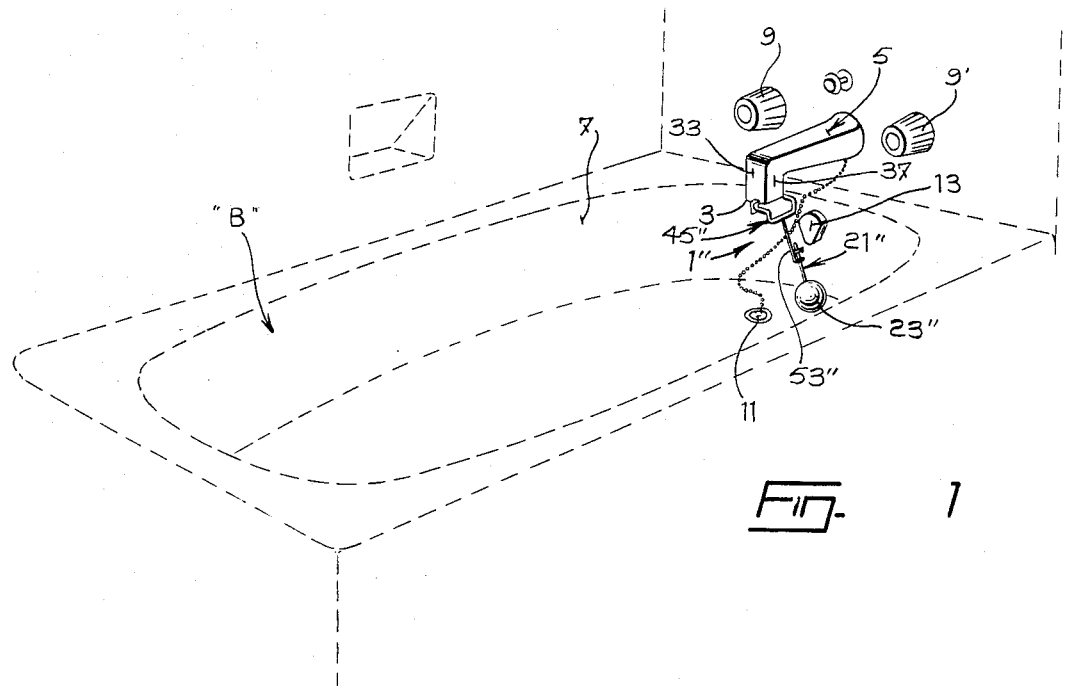
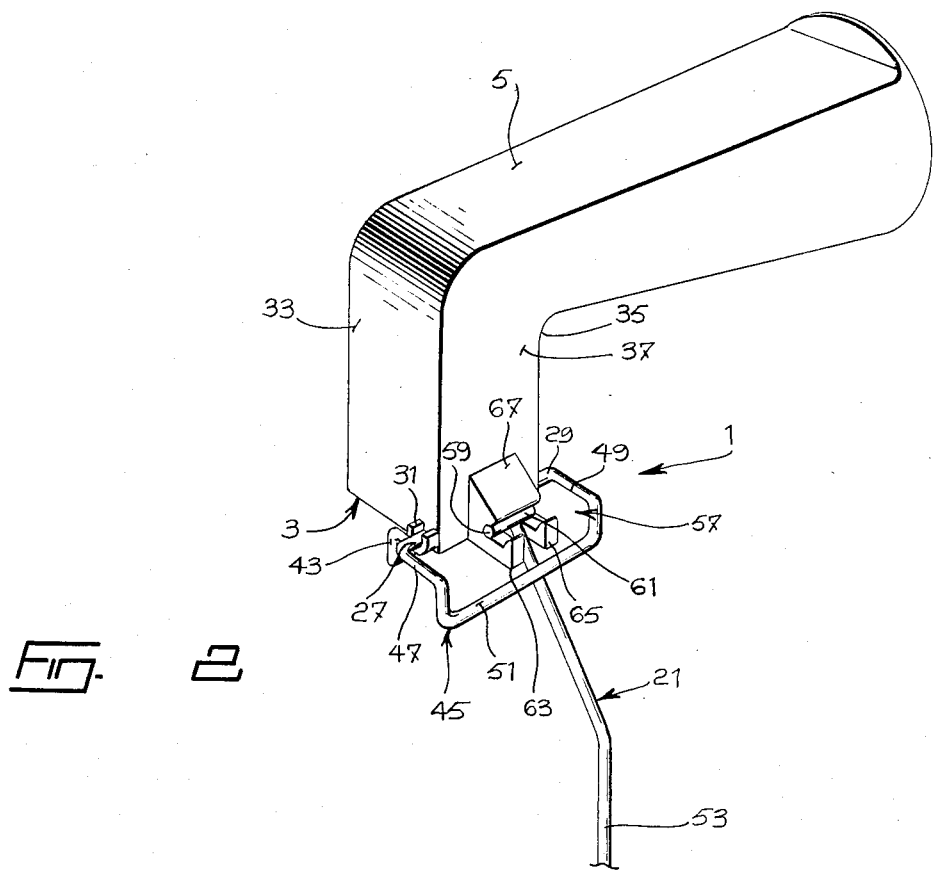

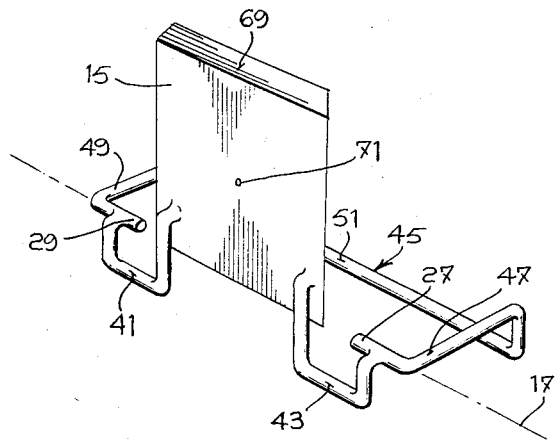
Fig. 3
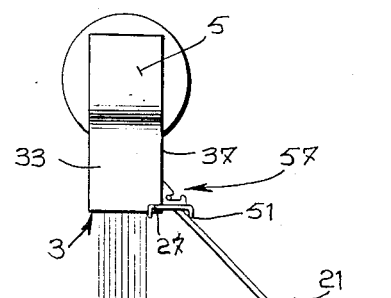
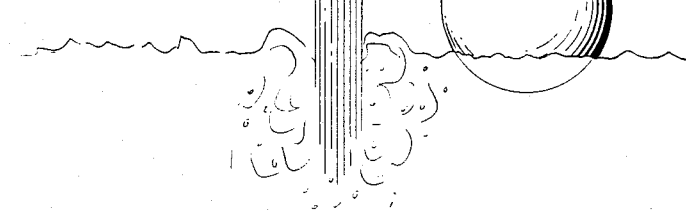
Fig. 4

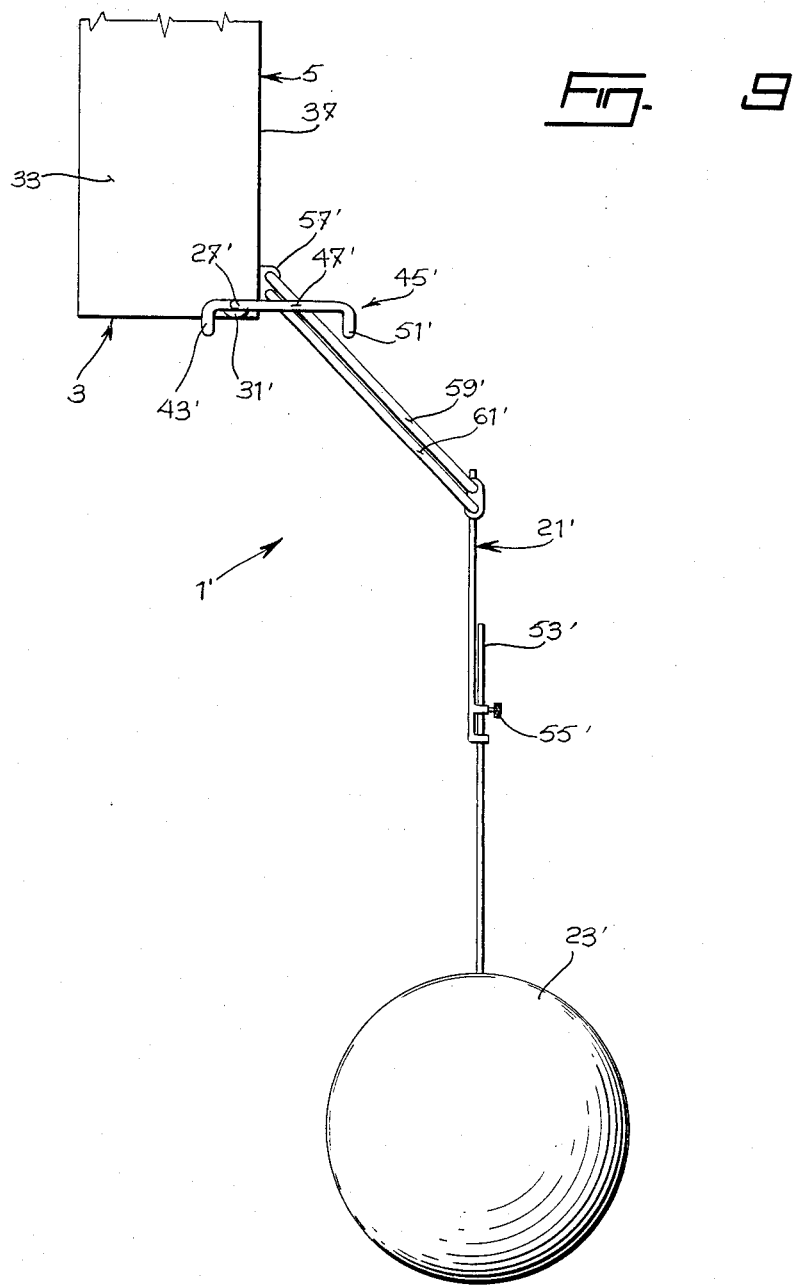

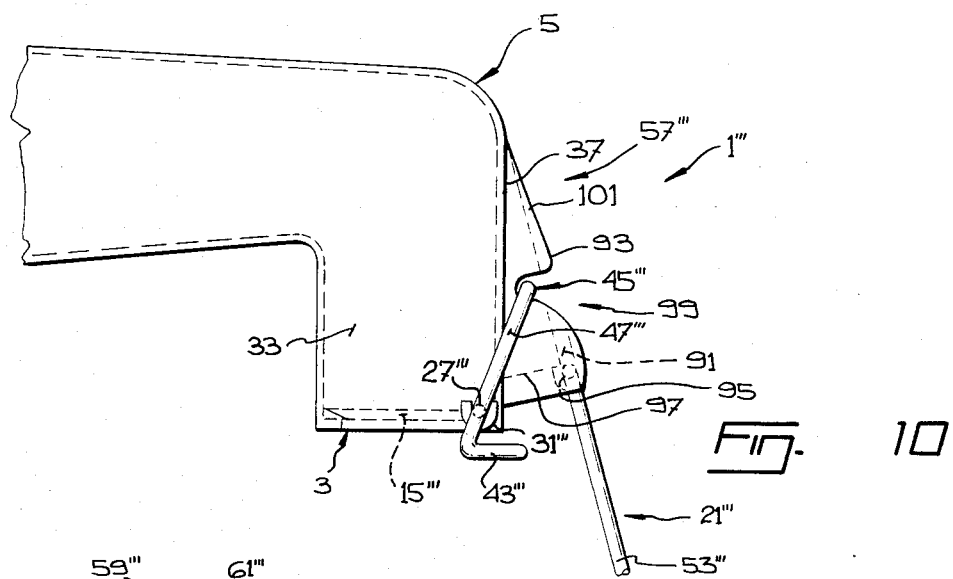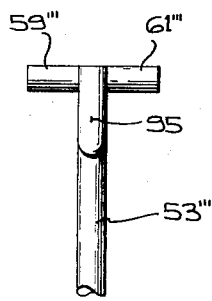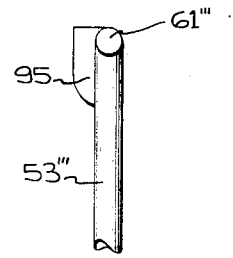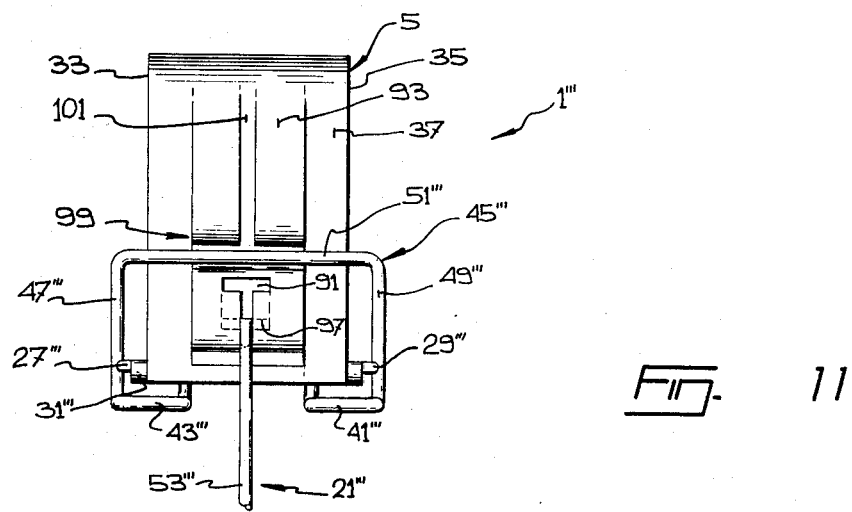

SAFETY VALVE FOR AUTOMATICALLY STOPPING THE FLOW OF A FLUID BROUGHT BY A CONDUIT TO A RESERVOIR

The present invention relates to a safety valve for automatically stopping the flow of a fluid brought by a conduit into a reservoir when the level of fluid in the reservoir has reached a maximum predetermined height.

The invention is particularly a safety valve for mounting at the end of a supply spout of a bathtub for automatically stopping the inflow of water when the latter has reached a maximum predetermined height in the bathtub and when, through inadvertence, the person desiring to take a bath forgets to close the taps.

It is known, particularly by insurance companies, that very serious damages may be made to a building as well as to furniture contained in the rooms of the building when someone desiring to take a bath turns the taps wide open to fill the bathtub then, through inadvertence, forgets that the taps have just been widely open and that the water continues to flow. This type of oversight, which results in overflowing of the bathtub during a more or less extended period of time, creates real floods that can be extremely detrimental to objects as well as to persons that may happen to be on the same floor or on a lower floor.

To remedy this problem, which is apparently extremely frequent, practically all of the bathtubs presently manufactured incorporate an overflow generally constituted by a simple opening connected directly to a drain pipe. In practice, it appears however that this type of overflow is rarely sufficient to compensate for the inflow of water, particularly where the hot and cold water faucets are both widely opened.

There is consequently presently a need for a simple and efficient safety device in the particular bathtub field, device that can avoid the various drawbacks mentioned above.

It is an object of the present invention to provide such a safety device which specifically meets the aforementioned need, although it may be useful in any other place where it is necessary to automatically stop the arrival of a fluid brought by a conduit into a reservoir when the level of the fluid in the reservoir reaches a predetermined maximum height or level.

This safety device advantageously comprises a valve of the type having a pivot-mounted obturation plate located in a housing provided in a supply conduit proximate the outlet thereof, and a control device including a float capable of rocking the obturation plate from an opened position where it allows free circulation of the fluid to a closure position where it obturates the supply conduit to block the passage thereof and consequently stop the flow of fluid in the reservoir when the level of the fluid has reached the predetermined maximum level.

The previously mentioned basic structure of this type of safety valves is already known, namely in the specific field of safety devices incorporated in the pouring spout of gasoline pumps for automatically shutting off the outflow of gasoline when the vehicle reservoir is filled. By way of example, there may be cited U.S. Pat. Nos. 1,054,500 of 1913; 2,303,179 of 1942 and 2,504,450 and 2,507,545 both of 1950. In another type of application, may likewise be cited U.S. Pat. No. 529,928 of 1894.

If the safety valves used in the pouring spout of gasoline pumps all have the same function as that sought in the present invention, they are not directly applicable in the very particular fields such as that of domestic bathtubs. The safety valves used in these pouring spouts are indeed completely incorporated in the structure thereof which is difficult to achieve in the case of feed spouts for bathtubs unless their length is tripled or quadrupled and, obviously, thereby substantially lowering the appearance of the assembly.

Even if such safety valves were adaptable to the feed spouts for bathtubs, the resulting assemblies would still be not ajustable in height and would always extend flush at the water level in the bathtub, thereby making their use hazardeous for the bathtub user. Furthermore, the safety valves known up to date are practically impossible to easily remove in order to clean and/or lubricate them although, such removal for the simple purpose of cleaning and/or sanitation is absolutely necessary when it comes to a bathtub. It thus follows that presently known safety valves cannot be used directly to meet the above-mentioned need.

It is thereforemore specifically an object of the present invention to provide a safety valve of the aforesaid type which is advantageously improved with respect to existing safety valves whereby to meet the specific need referred to above, namely in the particular bathtub field.

The safety valve according to the invention is advantageously characterized in that the pivot on which the obturation plate is mounted is provided on the outside of the housing and of the supply conduit.

For this purpose, the pivot may advantageously be made up of two aligned stub axles which respectively seat in two small supports rigidly secured on the two very opposed external surfaces of the housing in which the obturation plate lies. In this particular case, the obturation plate is rigidly fixed to its two stub axles by means of one, or preferably, two arms entering into the housing by the outlet of the supply conduit.

According to a preferred embodiment of the invention, the stub axles supports or bearings are excentrically secured on the outside of the housing in such a manner that the obturation plate, in open position, bears against one of the inner walls of the housing. This arrangement has the advantage of completely freeing the conduit of the obturation plate when the fluid flows.

According to another preferred embodiment of the invention, the device controlling the obturation plate acts on the latter to rock it by means of a lever which is rigidly connected to the plate. This lever may take the form of a stirrup of which the two ends are respectively fixed to the two pivot stub axles, or either are made to constitute the stub axles in question.

The control device may comprise, in known manner, a float secured at the end of a rod. The length of the rod is selected in such a way that the float be located in the reservoir at the predetermined maximum level or height. This rod may itself be fixed at its other end to the center of the stirrup. According to another embodiment, the rod may be fixed by its other end to a pivot provided on the outside of the housing, slightly above the central part the stirrup in such a way that the rod, by pivoting vertically under the Archimedes trust, take contact with the central part of the stirrup to force it to pivot about its two stub axles.

The main advantage of the safety valve according to the invention resides in the fact that all of the structural elements of the pivot of the obturation plate are on the outside of the housing and the supply conduit. These elements are therefore not directly in contact with the fluid flowing in the supply conduit and falling into the reservoir. Consequently, they are less subject to scaling and/or corrosion. Furthermore, since these elements are on the outside, they are easily accessible for cleaning. Finally, the assembly of these elements make the system easily removable and cleanable whenever the need arises.

The invention will be better understood from a reading of the description that follows of four preferred and non-restrictive embodiments thereof, the description making reference to the appended drawings wherein:

FIG. 1 is a general perspective view of a bathtub provided with a safety valve made according to a first embodiment of the invention;

FIG. 2 is a perspective view, on a larger scale, of the pouring spout of a bathtub provided with a safety valve made according to a second embodiment of the invention;

FIG. 3 is a perspective view of an obturation plate used in the safety valve illustrated in FIG. 2;

FIG. 4 is a elevation view of the safety valve shown in FIG. 2, in opened position in a bathtub being filed;

FIG. 9 is a side elevation view of the end of the pouring spout of a bathtub provided with a third type of safety valve made according to the invention;

FIG. 10 is a side elevation view of the end of the pouring spout of a bathtub provided with a fourth type of safety valve made according to the invention;

FIG. 11 is a front elevation view of the end of the pouring spout illustrated in FIG. 10; and FIGS. 12 and 13 are side and front elevation views of the upper end of the arm of the float used in the fourth type of safety valve made according to the invention.

Figure 5:
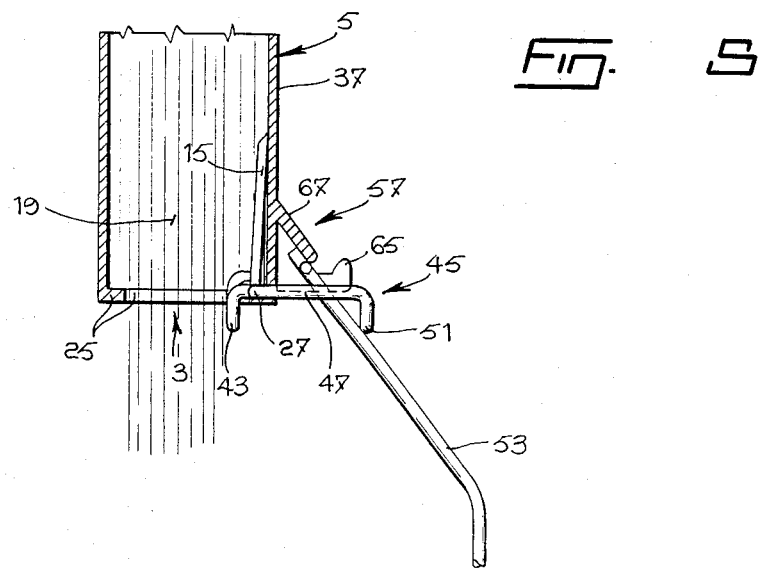
FIGS. 5 to 7 are cross-sectional views of the end of the pouring spout illustrated in FIG. 2, showing three different operating stages of the safety valve according to this particular embodiment of the invention.

The safety valve, made according to the invention, identified in a very general manner by numeral 1 in FIGS. 2 to 8, by numeral 1' in FIG. 9, by numeral 1" in FIG. 1 and by numeral 1''' in FIGS. 10 and 11 is intended to be mounted proximate the outlet 3 of a pouring spout 5 being integral with a supply pipe (not shown) of a fluid in a reservoir 7 which, as shown in FIG. 1, may namely be a bathtub B. The main object of this safety valve 1, 1', 1" or 1''' is to automatically stop the incoming of fluid flowing from the pouring spout into the reservoir when the level of the fluid in the reservoir in question has reached a predetermined maximum height or level.

In the description that follows, reference will be made exclusively to the various elements that constitute a bathtub of conventional type. It is however apropriate to specify that the safety valve according to the invention may be used in any other type of reservoir in that the present invention is not in any way restricted to the particular bathtub field.

The safety valve 1, 1', 1" or 1''', according to the invention, is specifically adapted to automatically stop the incoming of water by the pouring spout 5 of the bathtub B when the hot water tap 9 and the cold water tap 9' of the bathtub are wide open and the drain 11 is closed. As has been explained previously in the preamble to the present description, the overflow 13 usually incorporated in such bathtubs, is in most cases insufficient to avoid overflow of the bathtub in case of oversight.

Figure 6:
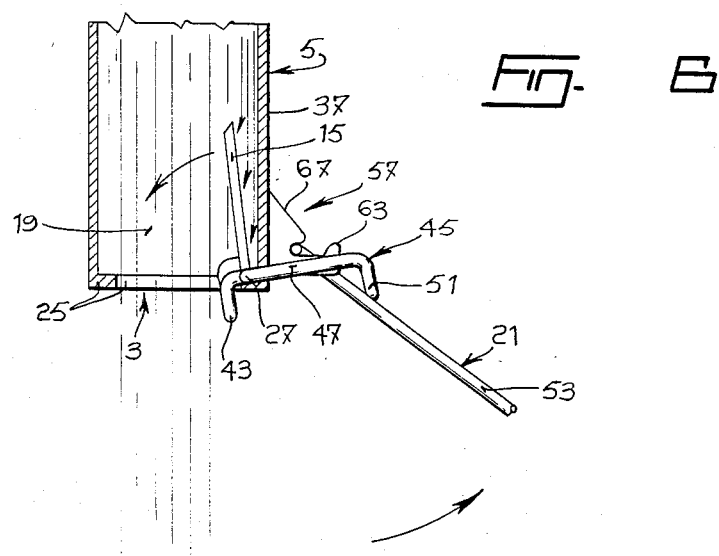
Figure 7:
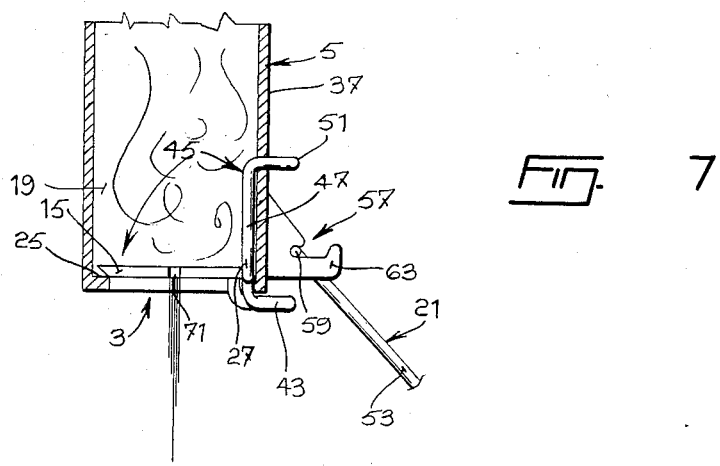

The safety valve according to the invention comprises, as a main element, an obturation plate 15 mounted on a pivot of general axis 17 (see FIG. 3) in a housing 19 (FIG. 5) provided at the end of the pouring spout 5 close to the outlet 3 thereof (see FIGS. 5 through 7).

The safety valve according to the invention also comprises a control device referred to by numerals 21, 21', 21", 21''' as the case may be, which includes a float 23, 23', 23" or 23''' to cause rocking of the plate 15 from an open position allowing free fluid flow (FIG. 5), to a closure position where it blocks the outlet 3 of the pouring spout 5 by spreading across it and bearing against a small peripheral ledge 25 acting as a seat for the plate 15 whereby to thus block the passage of water and consequently stop it from flowing into the bathtub 7 when the level of water has reached the predetermined maximum level (see FIG. 7).

As indicated in the preamble to the present description, the main original feature of the safety valve according to the invention resides in the fact that the pivot 17 on which the obturation plate 15 is mounted is constructed so that its structural elements lie outside of the housing 19 rather that being provided on the inside as is normally the case.

To achieve this, as can be seen on all of the figures of the appended drawings, the pivot 17 may advantageously take the form of two aligned stub axles 27 and 29 which respectively seat into two small half cylindrical bearings or supports 31 rigidly secured to the two very opposed external surfaces 33 and 35 of the housing 19 in which the obturation plate 15 lies.

With respect to the particular embodiments of FIGS. 1, 9, 10 and 11, these same elements as well as those hereinafter to be mentioned in relation with the safety valve are identified by the same reference numerals provided with prime ('), second (") or third (''') marks as the case may be for the sake of uniformity in presentation of the drawings. In the following description, use will not be made each time to these marks since the reference numerals are identical and in all cases represent the same structural elements whatever be their mark.

As shown more in detail in FIG. 3, the obturation plate 15 is rigidly secured to the stub axles 27 and 29 of the pivot 17 by means of two short arms 41 and 43 shaped as a U. One side leg of each of these U is fixed to one of the two stub axles of the pivot 17 whereas the other side leg of the U is welded directly to the plate. The depth of the U essentially depends on the location of the supports or bearing 31 since the main purpose of the arms 41 and 43 is to allow the obturation plate to enter into the housing 19 through the outlet 3 of the pouring spout 5 and to be actuated from the outside as clearly illustrated in the drawings.

While two mounting arms 41 and 43 have been shown on the appended drawings, a single central stem could be used mounted on the central bar of a U-shaped rod of which the two ends are welded to the stub axles 27, 29. Any other type of mounting may be used to connect the obturation plate with the stub axles 27 and 29.

In order to avoid that the plate 15 alters the fluid flow in open position and the arms 41 and 43 be too long or disproportionate, the bearings 31 and the stub axles 27 and 29 are preferably excentrically secured near the lower end of the housing 19, that is immediately next to the output 3, close to the external surface 37 of the housing 19 joining together the external surfaces 33 and 35. The particular positioning of these bearings 31 makes it sure that the obturation plate 15, in open position, lies against the inside surface of the housing 37, such as can clearly be seen from FIG. 5. In order to provide easy and effortless pivoting of the obturation plate 15, the arms 41 and 43 of the latter are preferably made in such a way that the stub axles 27 and 29 be located in the same plane as the plate. This particular feature is easily seen in FIG. 3.

The control device 21 of the obturation plate 15 is operable to rock it through a lever 45 rigidely connected to the plate 15. This lever preferably takes the form of a stirrup of which the ends of the two side legs 47, 49 are respectively secured to the stub axles 27 and 29 of the pivot 17. In fact, although it is nor compelory stirrup 45 may be manufactured in such a manner that the ends of its side legs 47, 49 be directly connected to the stub axles 27 and 29 instead of being connected to the mounting arms 41 and 43, as shown in all of the figures and namely in FIG. 3. This construction which causes the side legs 47 and 49 of the stirrup 45 to be externally positioned, substantially facilitates the plate removal, as will be explained hereinafter. From a constructional point of view, it is likewise compulsory to locate the central part 51 of the stirrup lever 45 at a level which is lower than that in which lie the side legs 47, 49. This downward offset which allows the stirrup to pass over the spout when the obturation plate is in closed position as shown in FIG. 7, can be obtained merely by folding, as clearly shown in the various figures of the appended drawings.

The stirrup 45 is advantageously disposed so as to extend into a plane which is perpendicular to that of the obturation plate 45 as clearly appears from the enclosed drawings, namely from FIGS. 3 and 5 to 7.

In accordance with a particular embodiment of the invention illustrated in the FIG. 1, the device 21" controlling the obturation plate 15 is formed by a float 23" secured at the end of a rod arrangement 53" which is preferably adjustable in length to set the float 23" at the desired height. This rod arrangement itself is slightly angularly fixed by its other end to the centre of the stirrup 45".

In accordance with a second embodiment of the invention shown in FIG. 9, the device 21' controlling the obturation valve 15 comprises an float 23' secured at the desired height at the end of rod arrangement 53', ajustable as to length so as to afford locating the float in the reservoir at the predetermined maximum level. This ajustment may be obtained by use of a simple knurled screw means 55' or by any other appropriate similar means. The rod arrangement 53' is connected to a pivot system 57' secured to the very external surface 37 of the housing 19 of the plate 15, slightly above the central part 51' of the stirrup 45' by means of two short parallel bars 59' and 61' located one above the other in such a manner as to form a deformable parallelogram. Deformation of this parallelogram. Deformation of this parallelogram is obtained by having the upper ends of the bars 59' and 61' pivotally mounted on the very pivot 57' and the lower end pivotally mounted on the upper end of the rod arrangement 53'.

As can now easily be understood, the level of the water in the bathtub causes a lifting of the float 23', by buoyancy, the rising movement of the float causes deformation of the parallelogram which straightens out as it moves up. By straightening out, the parallelogram bears against the central part 51' of the stirrup 45' which, for this purpose and to make the apparatus more sensitive, maybe bent down to lie in a lower plane as has been explained previously. The pressure applied by the float to the stirrup 45' is of course transmitted, via the pivot 17 to the obturation plate 15 which may then rock as will be explained further hereinafter.

In accordance with a third embodiment illustrated in FIGS. 2 to 8 of the appended drawings, the device 21 controlling the obturation plate 15 may comprise a float 23 secured at the predetermined maximum height at the end of a rod arrangement 53 which is adjustable in length by a knurled screw means 55 (see FIG. 4). This rod arrangement is secured at its other end to a pivot system 57 provided on the outside of the housing 19 and on the very surface 37 thereof. The pivot system 57 is located slightly above the central part 51 of the stirrup 45 so that the rod arrangement 53, by upwardly pivoting under buoyancy, comes in contact with the central part 51 of the stirrup 45 and forces it to pivot about the stub axles 27 and 29.

The upper end of the rod arrangement 53 has the shape of a small cross of which the two lateral branches 59 and 61 seat respectively in two small parallel bearings or supports 63 and 65 having the shape of small hooks slightly spread apart and extending perpendicularly from the external surface 37 of the housing 19 provided inside the pouring spout 5. These two small hook-shaped supports 63 and 65 together form the pivot system 57.

A small inclined cap 67 is provided on the very external surface 37 of the housing 19 so as to slightly project above part of the hook-shaped bearings 63 and 65. This small cap or hood 67 has, in practice, a dual function. First, because of its shape and location, it prevents the upper end of the cross shaped arrangement 53 of the control device to rise and separate from the supports or bearings 63 and 65 when the level of the water starts to rise in the bathtub. By preventing this rising movement, the hood 67 thus forces the rod arrangement 53 to pivot about the pivot system 57 and to lift the horizontal central part 51 of the stirrup 45 thereby pivoting the plate 15. To make this action easier, the rod arrangement 53 is preferably bent as clearly illustrated in FIG. 4. Similarly, in order to facilitate this movement, the central part 51 of the stirrup 45 is made lower by simple folding as has been explained previously.

In addition, the small hood 67 applies a torque with bearings 63 and 65, onto the arm 53 when the water inside the bathtub has not reached the float yet. Rotation of the float about its pivot 57 is thus initiated, thereby reducing the risks of a rotation of the float in the wrong direction, or of jamming of said float in vertical position. Of course, this substantially improves the reliability of the safety valve according to the invention.

Figure 8:
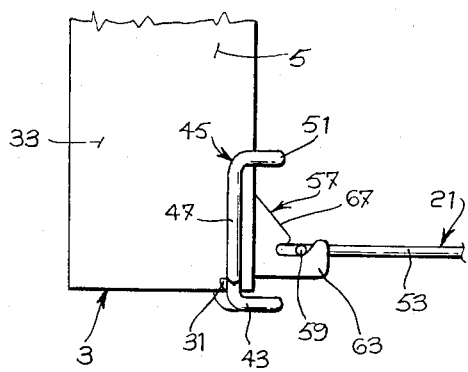
FIG. 8 is a side elevation view of the end of the pouring spout illustrated in FIG. 2, showing the control device in disengaged position.

Besides, the small hood 67 makes it possible, when desired, to hold the float and its rod arrangement in semi-horizontal position to avoid having the float lie between the legs of a person taking a bath once the tub is filled. Holding of the float in horizontal position is obtained, as illustrated in FIG. 8, by making sure that the lower edge of the hood 67 comes to bear against the top of the small cross at the end of the rod arrangement 53 to hold it in overhanging fashion at the very end of the supports or bearings 63 and 65.

Finally, in accordance with a fourth embodiment illustrated in FIGS. 10 to 13 on the appended drawings, the device 21''' controlling the obturation plate 15''' may comprise a float (not shown) secured at the predetermined maximum height at the end of a rod arranged 53''' which is adjustable in length. This rod arrangement 53''' is secured at its other end to a pivot system 57''' provided on the outside of the surface 37 of the housing 19. The pivot system 57''' is located slightly above the central part of the stirrup 45''' so that the rod arrangement 53''', by upwardly pivoting under buoyancy, comes in contact with the central part 51''' of the stirrup and forces it to pivot about the stub axles 27''' and 29'''.

The upper end of the rod arrangement 53''' has the shape of a small T of which the two lateral branches 59''' and 61''' sit in a small, T-shaped groove 91 to provide on the surface of a prism-shaped projection 93 located onto the surface 37 of the housing. A small locking projection 95 is provided onto the top of the rod arrangement 53'''. This locking projection 95 is positioned to bear onto the lower surface 97 of the projection 93 to prevent that the float and its rod arrangement 53''' rise and get out of the T-shaped groove 91 under buoyancy.

The central part of the projection 93 is provided with a large horizontal groove 99 which is shaped to let the stirrup 45''' free to pivot, whereby the obturation plate 15''' may accurately rotate from an opened position to a closed position where the incoming of water is stopped.

This arrangement is particularly interesting in that, on one hand, its construction permits the use of a stirrup 45''' of which the lateral side 47''' and 49''' are not bent to offset the central rod 51''' downwardly. This arrangement is also advantageous in that, by simply providing a vertical groove 101 over the T-shaped groove 91, one can position the float and rod arrangement in inversed position, thereby making the float and its rod arrangement extending upwardly in the vertical direction out of the water.

As can now be understood, the assembly made up of the obturation plate 15 and its stirrup 45 is mounted as shown in FIG. 5 when it is desired to fill the bathtub. In this position, the plate 15 which then lies against the wall 37 completely frees the outlet of the pouring spout 5. Due to its position, the plate 15 is not affected by the fluid and therefore does not hinder in any way the filling of the tub. When the level of the water in the bathtub starts to rise, the float 23 is lifted by buoyancy. This lifting movement causes rotation of the rod arrangement 53 about its pivot 57 or, in the case of FIG. 1, about the pivot 17 of the plate 15 via the stirrup 45. The rod arrangement 53, by rising, comes to bear against the horizontal central part 51 of the stirrup 45. In the case of FIG. 1, the rod arrangement 53'' lifts central part directly and forces the obturation plate 15 to pivot about its stub axles 27 and 29 toward the inside of the housing. This pivoting force moves the plate 15 away from the wall 37 (see FIG. 6).

As soon as this pivoting movement takes on a certain amplitude, the fluid accelerates the closing movement and brings the plate bluntly across the housing where it comes to rest on the seat 25, as illustrated in FIG. 7. Rocking of the plate comes to block the incoming water, and consequently, stops water from flowing into the tub.

The safety valve described above thus well insures the safety function previously mentioned.

In order to provide better waterproofing of the housing once the obturation plate 15 has rocked, a small rubber seal (not shown) maybe provided on the upper surface of the seat 25 over which bears the peripheral edge of the obturation plate 15.

On the other hand, in order to prevent the valve from inadvertently closing in case of heavy water turbulence in the housing 19, the upper edge 69 of the obturation plate 15 may be rearwardly chamfered, as shown in FIG. 3.

Finally, some means may be provided to lower the pressure upstream of the obturation plate 15 once the latter is closed. Indeed, were not such means be provided for that purpose, it could be difficult in certain cases to reopen the valve once it has closed, even when the taps 9 and 9' of the bathtub are themselves closed. In order to allow this upstream pressure to fall, any means can be used. The simplest one however is, as illustrated in FIGS. 3 and 7, the provision of a small hole 71 through the plate 15. The diameter of this hole may be appropriately selected to insure a small water flow which is permanent and sufficient to cause the necessary pressure drop. This small water flow may remind the bathtub users to close the taps and to avoid that the safety valve remains in operation position for a very long time.

As can be understood, the safety valve according to the invention essentially comprises two unitary parts. The first of these parts is made up of the obturation plate 15, of the arms 41 and 43, of the stub axles 27 and 29 and of the stirrup 45. The second of these parts is made up of the control device including the rod arrangement 53 and the float 23. Either one of these parts is easily removed which makes maintenance extremely easy.

Removal of the control device 21 is extremely simple as can be seen directly from a study of the drawings. Removal of the other part is, however, slightly more delicate and must be carried out in two steps. In a first step, the obturation plate is lifted after having opened it and the stub axles are removed from their supports or bearings. To this end, it is necessary to give the U-shaped arms a sufficient depth clearance. The valve is then rotated about the axis of the housing in such a manner as to bring it in a diagonal position. In this position, the plate may easily be moved out by drawing it downwardly.

The facility with which it can be removed makes the maintenance of the apparatus extremely easy. This maintenance is besides facilitated in as much as the mechanical assembly which provides pivoting of the plate, and in particular the stub axles 27 and 29, lie completely outside of the pouring spout and thus is never in direct contact with the fluid.

It is of course to be understood that various modifications maybe brought to the various embodiments that have just been described while remaining within the scope of the present invention as such is defined in the following claims.

What is claimed is:

1. A safety valve for automatically stopping the flow of a fluid coming from a supply conduit, into a reservoir when the level of the fluid in the reservoir has reached a predetermined maximum height, said safety valve being of the type comprising:

an obturation plate pivotally mounted in a housing of said supply conduit close to the outlet thereof, and a control device including a float adapted to rock said plate from an open position where said plate allows free flow of said fluid to a closed position where said plate obturates said conduit outlet to thereby stop flow of said fluid into said reservoir when the fluid level therein has reached said predetermined maximum level, characterized in that said obturation plate is pivotally mounted by a pivot arrangement located outside of said housing and of said supply conduit;

said pivot arrangement is constituted by two aligned stub axles respectively seating into two bearings made solid with two opposed external surfaces of said housing, and said obturation plate is made solid with said stub axles by means of at least one arm entering said housing through said outlet of said supply conduit.

2. A safety valve as claimed in claim 1, characterized in that said bearings of said stub axles are exentrically secured outside said housing in a manner such that said obturation plate, in active open position thereof, bears against one of the inner walls of said housing.

3. A safety valve as claimed in claim 1, characterized in that said at least one arm is constructed so that said stub axles constituting said pivot arrangement lie in the same plane as that of said obturation plate.

4. A safety valve as claimed in claim 3, characterized in that said obturation plate is rigidly secured to said stub axles by means of two separate arms, each arm being associated with only one stub axle.

5. A safety valve as claimed in claim 3, characterized in that said control device of said obturation plate causes rocking of said plate by means of a lever which is rigidly connected to said plate.

6. A safety valve as claimed in claim 5, characterized in that said lever is in the form of a stirrup of which the two ends are secured respectively to said two pivot stub axles.

7. A safety valve as claimed in claim 6, characterized in that said pivot stub axles are integrally formed from the very ends of said stirrup.

8. A safety valve as claimed in claim 7, characterized in that said stirrup extends in a plane which is perpendicular to that of said obturation plate.

9. A safety valve as claimed in claim 8, characterized in that said control device of said obturation plate is made of a float secured to one end of a rod which, itself, is secured at its other end to the centre of said stirrup, the length of said rod being so selected that said float be located in said reservoir at said predetermined maximum level.

10. A safety valve as claimed in claim 8, characterized in that said control device of said obturation plate is constituted by a float held at said predetermined maximum level in the reservoir by being secured to the end of a rod of which the other end is secured to a pivot provided outside of said housing slightly above the central part of said stirrup, in a manner such that when said rod vertically pivots under buoyancy, it comes to bear against this central part of said stirrup and forces said stirrup to pivot about said stub axles.

11. A safety valve as claimed in claim 10, characterized in that said rod of said control device is connected, by means of a pair short parallel bars mounted one above the other in a manner such as to define a deformable parallelogram which, when deforming, comes to bear against the central part of said stirrup and forces said stirrup to pivot about said axles.

12. A safety valve as claimed in claim 10, characterized in that the pivotally mounted end of said control device has the shape of a cross of which the branches form two axles coming to seat into parallel bearings.

13. A safety valve as claimed in claim 12, characterized in that it further includes means, proximate said two bearings of the branches of the control device, to hold in cooperation with said two bearings, said arms and said float of said control device in horizontal position when said device is no longer required.

14. A safety valve according to claim 9, intended for use in combination with a faucet of a bathtub, characterized in said obturation plate, said arms, said stub axles and said stirrup on the one hand and said control device on the other end each form an assembly that can easily be removed for cleaning purposes.

15. A safety valve as claimed in claim 9, characterized in that the upper edge of said plate, facing towards said fluid flow, is bevelled.

16. A safety valve as claimed in claim 9, characterized in that said plate is provided with a small through hole to allow escape of a thin jet of fluid when said plate is in closure position.

17. The safety valve as claimed in claim 10, characterized in that the end of the rod which is secured to a pivot has the shape of a T of which the two lateral branches together from an axle that fit in a small groove projecting onto the external surface of the housing.

18. The safety valve as claimed in claim 17, characterized in that it further comprises retaining means for supporting the T shaped end of the rod of the controlled device when the same is located into the groove to hold the rod and the float attached thereto in a vertical position over the housing when the safety device is no more necessary.

19. The safety valve as claimed in claim 18, characterized in that said retaining means consists of a groove provided in the external surface of the housing over the projecting groove.

* * * * *